US010928642B2

(12) United States Patent
Bakin et al.

(10) Patent No.: US 10,928,642 B2
(45) Date of Patent: Feb. 23, 2021

(54) GENERATING STRUCTURED LIGHT

(71) Applicant: ams Sensors Singapore Pte. Ltd., Singapore (SG)

(72) Inventors: Dmitry Bakin, San Jose, CA (US); Markus Rossi, Jona (CH)

(73) Assignee: ams Sensors Singapore Pte. Ltd., Singapore (SG)

(*) Notice: Subject to any disclaimer, the term of this patent is extended or adjusted under 35 U.S.C. 154(b) by 0 days.

(21) Appl. No.: 16/630,918

(22) PCT Filed: Jul. 18, 2018

(86) PCT No.: PCT/IB2018/000896
§ 371 (c)(1),
(2) Date: Jan. 14, 2020

(87) PCT Pub. No.: WO2019/016596
PCT Pub. Date: Jan. 24, 2019

(65) Prior Publication Data
US 2020/0225501 A1    Jul. 16, 2020

Related U.S. Application Data

(60) Provisional application No. 62/533,992, filed on Jul. 18, 2017.

(51) Int. Cl.
G02B 27/42     (2006.01)
G01B 11/25     (2006.01)
G02B 13/22     (2006.01)

(52) U.S. Cl.
CPC ........ *G02B 27/425* (2013.01); *G01B 11/2513* (2013.01); *G02B 27/4277* (2013.01); *G02B 13/22* (2013.01)

(58) Field of Classification Search
None
See application file for complete search history.

(56) References Cited

U.S. PATENT DOCUMENTS

2010/0284082 A1    11/2010    Shpunt
2013/0044187 A1    2/2013     Hammes et al.
2016/0178915 A1    6/2016     Mor et al.

OTHER PUBLICATIONS

International Search Report for corresponding International Application No. PCT/IB2018/000896 dated Jul. 18, 2018.
International Preliminary Report on Patentability for Application No. PCT/IB2018/000896 dated Jan. 21, 2020 (8 pages).

*Primary Examiner* — Vip Patel
(74) *Attorney, Agent, or Firm* — Michael Best and Friedrich LLP

(57) ABSTRACT

Structured light projection system includes an array of light emitting devices, which is configured to emit a pattern of light. A projection lens is configured to receive and project the pattern of light from the array to a first optical element. The first optical element alters the pattern of light to generate a first emitted pattern of light that is irregular. The first emitted pattern of light is transmitted to a second optical element that is configured to receive the first pattern of light and reproduce the first emitted pattern along a second emitted pattern, which comprises multiple instances of the first emitted pattern arranged in a tiled pattern.

18 Claims, 7 Drawing Sheets

GENERATING STRUCTURED LIGHT

CROSS REFERENCE TO RELATED APPLICATION

This patent application is the U.S. national stage entry, under 35 U.S.C. § 371 of International Application No. PCT/IB2018/000896, filed Jul. 18, 2018, which claims the benefit of and priority to U.S. Provisional Patent Application No. 62/533,992, filed Jul. 18, 2017, which is owned by the assignee of the instant application and incorporated herein by reference in its entirety.

TECHNICAL FIELD

The present invention relates generally to light projection systems, and methods and apparatuses for generating structured light patterns.

BACKGROUND

Light projection systems are used in a variety of applications to cast a pattern of light upon a surface. For example, known light projection systems can be used in determining the three-dimensional (3D) shape of objects. In known methods for 3D shape measurement, or 3D mapping, a structured light pattern is first projected onto the object surface. An image of the fringe pattern that is phase modulated by the object height distribution is recorded, and then used to calculate the phase modulation, to which an algorithm is applied to obtain a phase distribution proportional to the object height variations. Finally, from the phase distribution, real world coordinates are constructed. Typically, it is advantageous to use a structured light pattern that is an irregular pattern in a method for 3D shape measurement because of the subsequent calculation of phase modulation and determination of phase distribution.

Previous light projections system used in 3D shape measurement comprise light emitting elements, which can be light-emitting diodes (LEDs) or vertical-cavity surface-emitting laser (VCSEL) diodes, and a means to project the emitted light pattern onto a surface. Light projection systems can use a projection lens or additional optical elements to project the emitted light pattern onto a surface, or alter and then project the emitted light pattern onto a surface. Such optical elements can be a diffractive optical element (DOE). DOEs are configured to diffract an incoming beam or pattern of light to generate an output pattern in a predetermined way. Through the use of DOEs, an incoming beam or pattern of light can be collimated, or be shaped into a different intensity pattern and with a lower output energy than the incoming beam or pattern of light.

SUMMARY

As mentioned above, an irregular light pattern provides advantages in a method for 3D shape measurement. However, manufacturing an array of light configured to produce an irregular light pattern is costly. The present invention provides a structured light system that does not require an irregular array of light emitting devices, but instead, relies on an optical element to create an irregular emitted light pattern from an array of light emitting devices that emit a regular pattern.

Using an optical element to achieve an irregular pattern of light not only avoids the costs associated with manufacturing an irregular array of light emitting devices, but also demonstrates advantages over other alternative solutions for producing an irregular pattern of light. For example, one could use an array of light configured to produce a regular pattern of light and selectively choose which light emitting devices in the array to toggle on or off in order to produce an irregular pattern of light; however, this alternative would disadvantageously increase the power consumed by the structured light system.

The structured light projection system of the present invention can include an array of light emitting devices, which can be configured to emit a pattern of light. The pattern of light is received by a first optical element, which is configured to alter the pattern of light to generate a first emitted pattern of light that is irregular. The first emitted pattern of light can then be transmitted to a second optical element, which is configured to receive the first pattern of light and reproduce the first emitted pattern along a second emitted pattern, which comprises multiple instances of the first emitted pattern arranged in a tiled pattern.

The method of generating a structured light pattern comprises emitting a pattern of light from an array of light emitting devices, altering that pattern using a first optical element to generate a first emitted pattern of light, and reproducing the first emitted pattern of light along a second emitted pattern.

Embodiments of the systems and methods described can include one or more of the following features. Unless otherwise stated, any of the various features can be included or implemented in any combination with one another in the systems and methods described below.

The systems and methods can further comprise a projection lens system configured to receive light emitted from the array of light emitting devices and project the light to the first optical element.

In some embodiments, the array of light emitting devices comprises a grid of light emitting devices. For example, the grid can comprise a 12 by 9 grid of light emitting devices.

In some embodiments, the light emitting devices comprise VCSELs.

In some embodiments, the pattern of light emitted from the light emitting devices comprises a uniformly distributed pattern, the first emitted pattern comprises an irregular pattern, and the second emitted pattern comprises a uniform distribution of the irregular pattern.

In some embodiments, the pattern of light emitted by the light emitting devices comprises a grid of individual clusters of light emitting devices, the individual clusters of light emitting devices comprising light emitting devices arranged in a non-uniform pattern. For example, adjacent clusters of light emitting devices can comprise light emitting devices arranged in a common non-uniform pattern. For example, adjacent clusters of light emitting devices can comprise light emitting devices arranged in differing non-uniform patterns. In some cases, the adjacent clusters of light emitting devices are arranged in a sequence of differing non-uniform patterns, the sequence being reproduced, or repeated, at least once.

In some embodiments, the tiled pattern comprises adjacent instances of the first emitted patterns at least partially overlapping with one another. In some cases, overlapping patterns include at least one element of a first pattern instance being disposed within or between multiple elements of a second pattern instance. In some embodiments, despite adjacent instances at least partially overlapping with one another, at least some portions of the individual instances, such as include a central region, a majority portion, or a majority portion of a central region, can be unobstructed by an adjacent instance. That is, in some cases, adjacent instances (e.g., tiles) can partially overlap one another yet remain substantially distinct or unaltered by surrounding tiles. In some embodiments, overlapping instances or tiles can each be at least about 20% (e.g., at least about 30%, 40%, 50%, 60%, 70%, 80%, 90%, 95%) non-overlapping, where the non-overlapping portions of tiles are representative of the pattern of light provided to the second optical element (e.g., the first pattern). As depicted in FIG. 2, interlaced tiles can include a central non-overlapping portion and an outer overlapping portion (e.g., an overlapping border) that overlaps with an outer overlapping portion of an adjacent tile.

In some embodiments, the tiled pattern comprises adjacent instances of the first emitted patterns separate from one another.

In some embodiments, the tiled pattern comprises an arrangement of the first emitted pattern arranged in a series of columns and rows. In some examples, the arrangement comprises a 3 by 3 matrix. In some examples, the arrangement comprises a 2 by 2 matrix.

BRIEF DESCRIPTION OF THE DRAWINGS

The aspects of the invention described above, together with further advantages, can be better understood by referring to the following description taken in conjunction with the accompanying drawings. The drawings are not necessarily to scale, emphasis instead generally being placed upon illustrating the principles of the invention.

DETAILED DESCRIPTION

Figure 1:
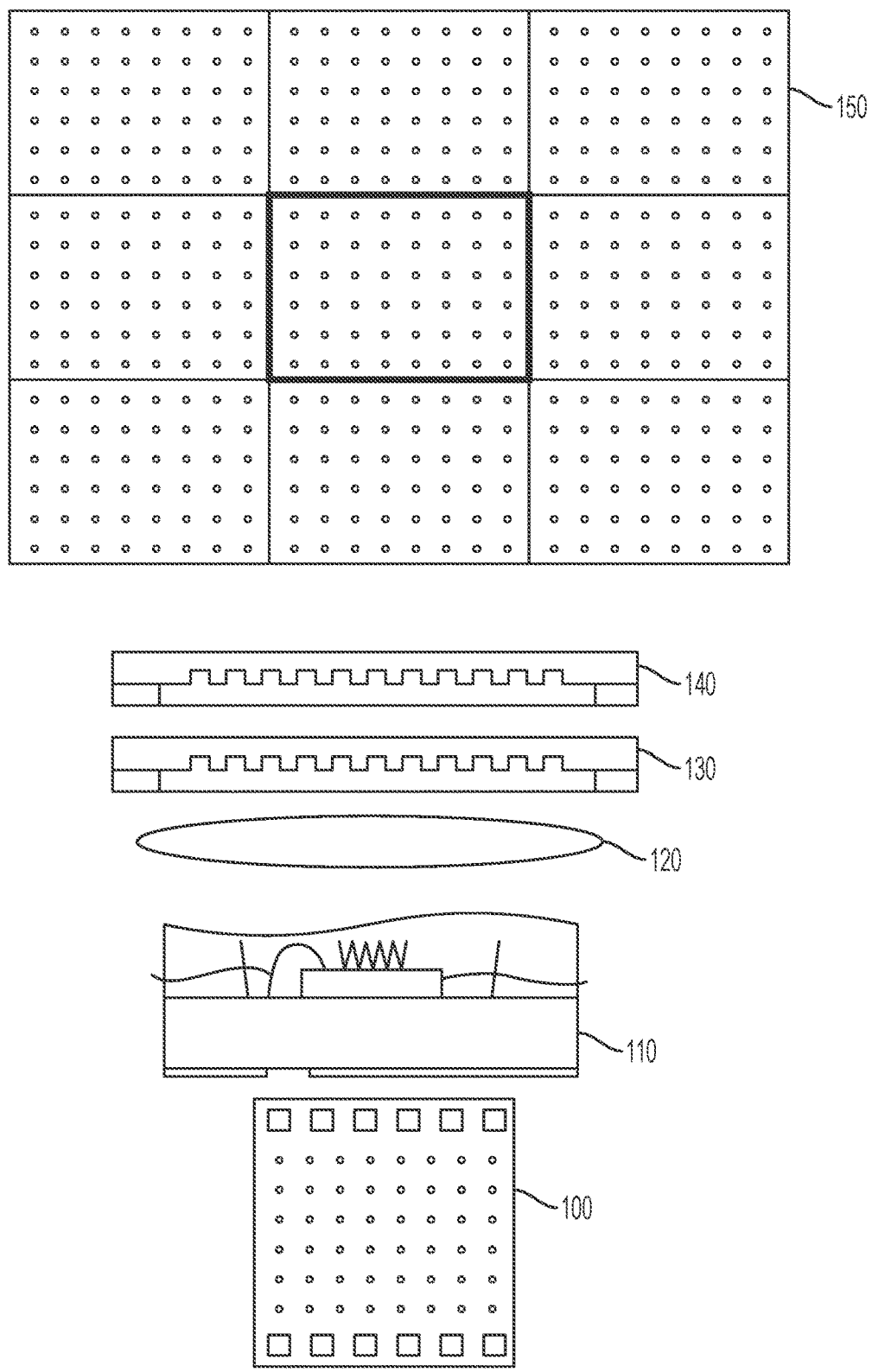
FIG. 1 illustrates one embodiment of a structured light projection system, according to the principles of the present invention.

FIG. 1 illustrates an example of a structured light projection system in accordance with some of the embodiments described above. In the example system, an array of light emitting devices 100 emits a pattern of light. In some embodiments, the light array 100 comprises a group of three, 12 by 9 grids of VSCELs, or a total of 324 VCSELs. In other embodiments, the pitch of the light array can be 40 micrometers (μm), and can be potentially reduced to as low as 20 μm. In still other embodiments, the light array can be in a staggered layout.

A projection lens system 110, with a projection lens 120, is configured to receive light emitted from the array of light emitting devices and project the light to a first optical element 130. The first optical element 130 alters the pattern of light emitted by the light array 100 to generate a first emitted pattern of light. In this alteration, the first optical element 130 splits each light emitting device in the light array 100 into a given number of irregular, encoded dot positions. The first emitted pattern of light is received by the second optical element 140, which is configured to reproduce the first emitted pattern along a second emitted pattern. The second pattern comprises multiple instances of the first emitted pattern arranged in a tiled pattern, which can form an irregular projected dot pattern 150. The irregular projected dot pattern 150 produced by the second optical element 140 covers the full field of illumination.

Typically, the first optical element 130 splits each light emitting device into 12 dot positions when the tiled pattern comprises a 2 by 2 matrix, or 30 dot positions when the tiled pattern comprises a 3 by 3 matrix. Accordingly, in some embodiments, the irregular projected dot pattern 150 comprises approximately 32,000 dots, with each unit cell size comprising between 30 to 80 dots.

The example system of FIG. 1 can be used to carry out any of the various methods described herein. Additionally, the example systems illustrated and described herein can be manufactured using the manufacturing methods described herein.

Figure 2:
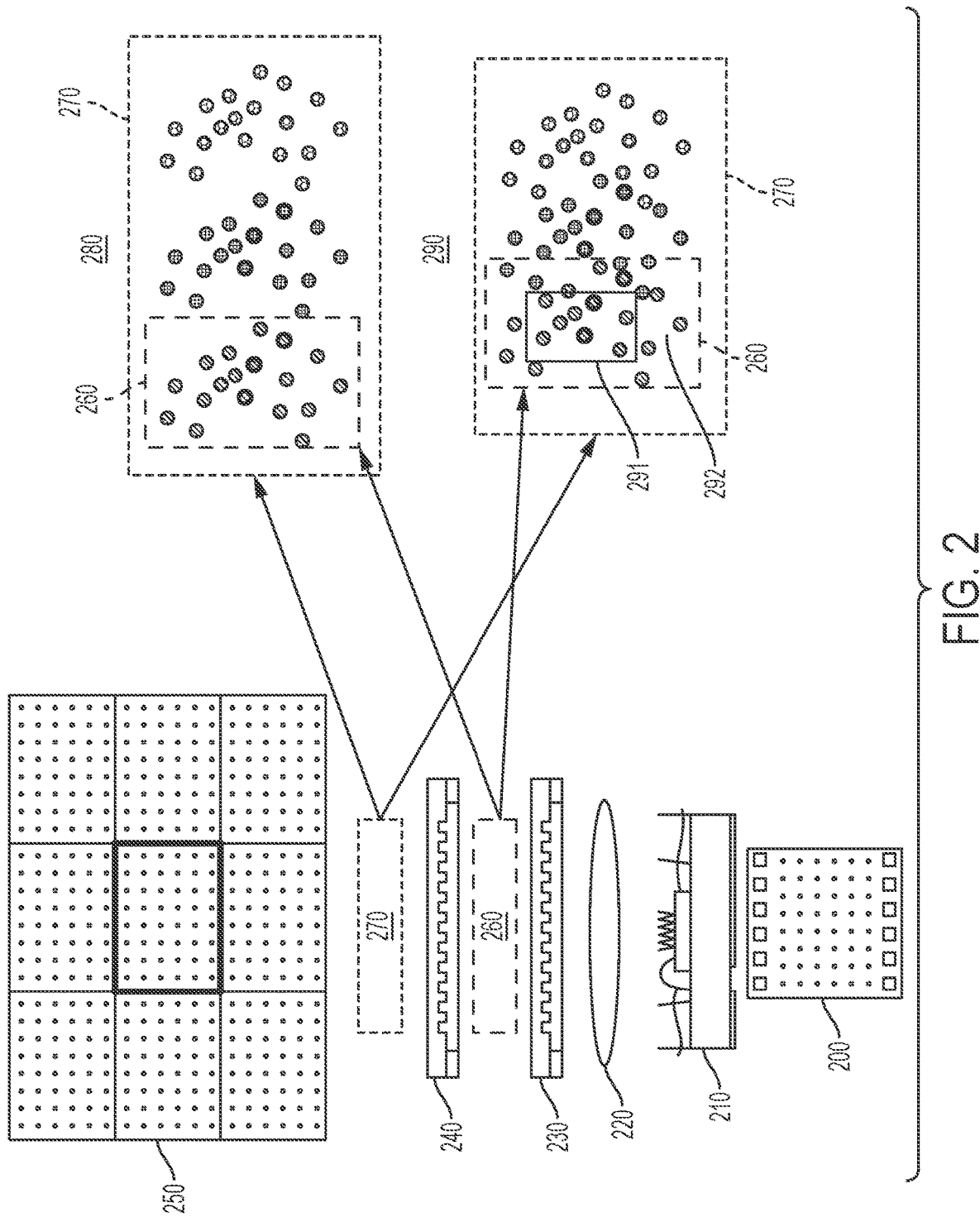
FIG. 2 illustrates one embodiment of a structured light projection system, according to the principles of the present invention, and illustrates exemplary light patterns generated by the embodiment of the present invention.

FIG. 2 illustrates example light patterns that can be generated and projected by the example structured light projection systems described herein. The light array 200 in FIG. 2 corresponds to the light array 100 in FIG. 1; the projection lens system 210 in FIG. 2 corresponds to the projection lens system 110 in FIG. 1; and the projection lens 220 in FIG. 2 corresponds to the projection lens 120 in FIG. 1. As discussed above and depicted, the first optical element 230, upon receiving the light emitted from the light array 200 by way of the projection lens system 210, can generate a first pattern of light 260, which can be an irregular pattern. Example first patterns of light can be a tiled multiplication pattern 280 or an interlaced multiplication pattern 290. As discussed above and depicted, the second optical element 240 can reproduce the first pattern of light 260 to create multiple instances of the first pattern of light 260, forming a second pattern of light 270. The second pattern of light 270 can form the irregular projected dot pattern 250 projected from the structured light projection system.

In embodiments in which the second pattern of light 270 is an interlaced multiplication pattern 290, there is one or more non-overlapping portions 291 and one or more overlapping portions 292 formed by adjacent instances of the first pattern of light 260.

Figure 3A:
FIGS. 3A-3C are illustrations of exemplary arrays of light emitting devices, with columns and rows of light emitting elements in a perpendicular or angled arrangement, which can be used according to embodiments of the present invention.
Figure 3A:
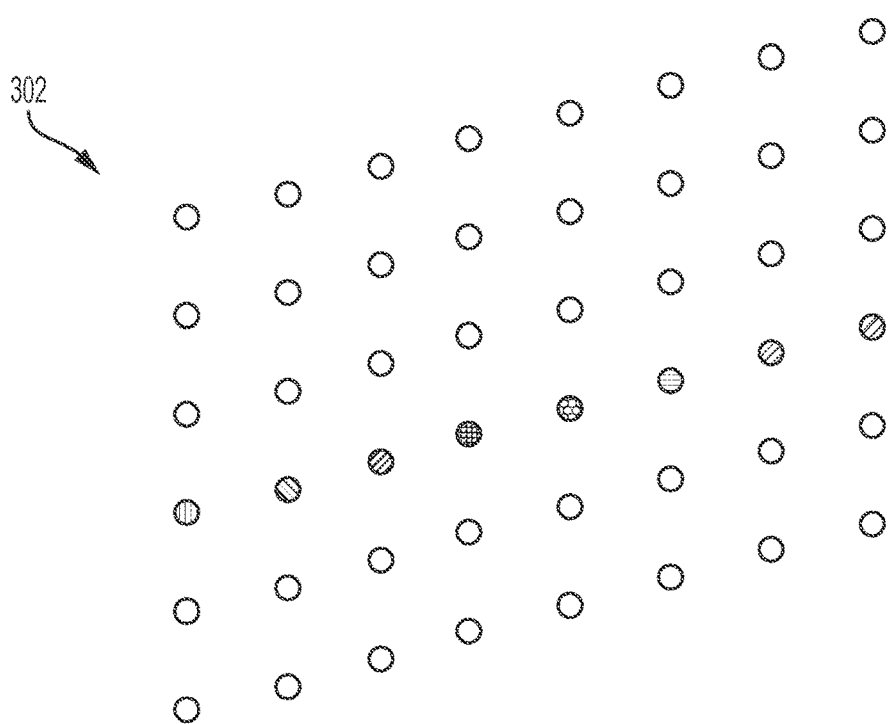
Figure 3B:
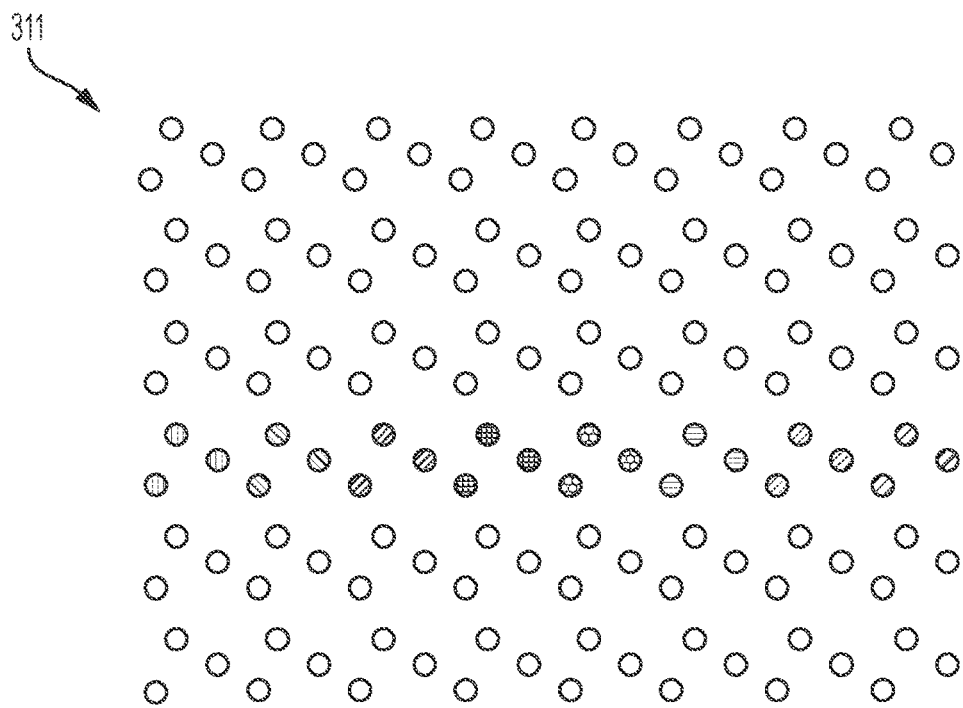
Figure 3B:
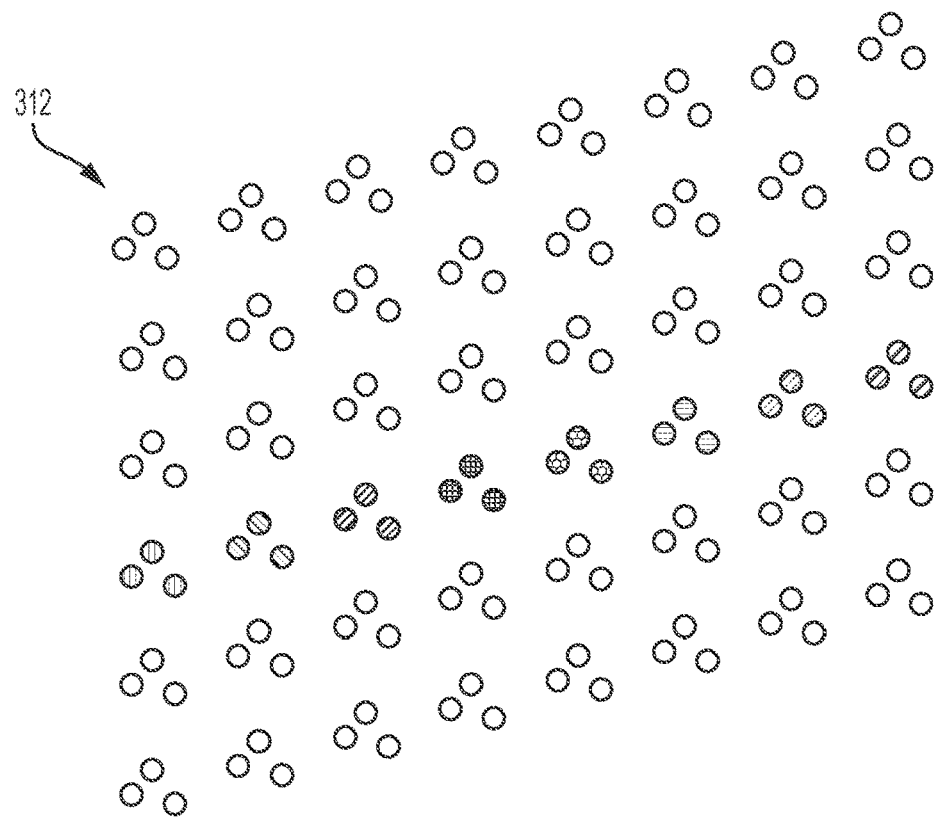
Figure 3C:
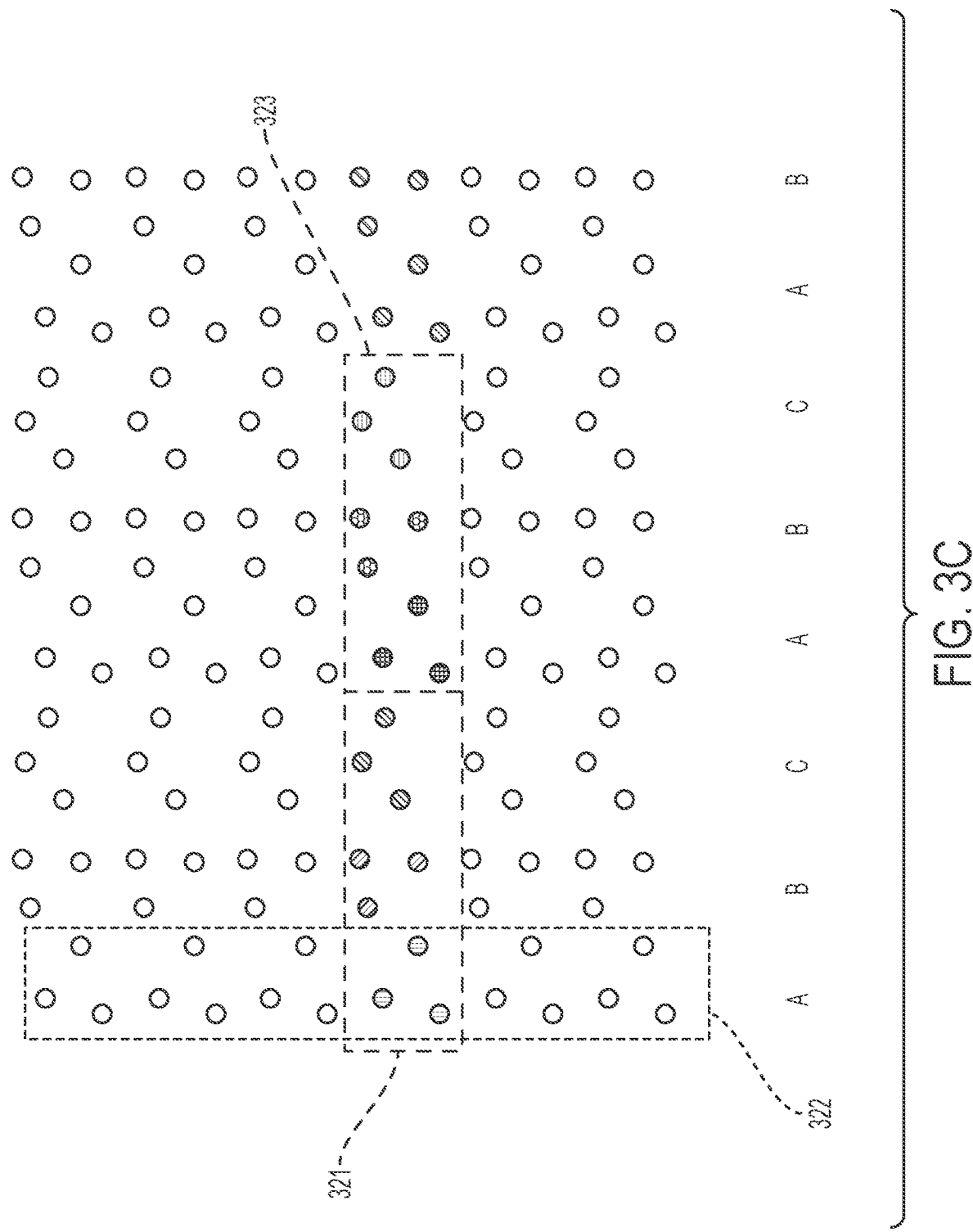

FIGS. 3A-3C illustrate three different example embodiments for light patterns that can be generated using the systems and methods described herein.

For example, FIG. 3A depicts examples in which the light array projects a regular (e.g., grid) pattern of light. The term regular or grid can include repeated or consistent patterns of light emitting elements. In some cases, the regular pattern 301 includes columns and rows of light emitting elements that are arranged generally perpendicularly relative to one another. In some cases, the regular pattern of light can include an angled regular (e.g., slanted or rhombus-like) pattern 302. That is, in some embodiments, the regular pattern includes columns and rows of light emitting elements in which rows can be angled, or non-perpendicular, with respect to the direction of columns.

FIG. 3B depict examples in which the array projects a regular pattern of a sub pattern of lights. In some embodiments, the sub pattern of lights comprises smaller clusters of light. In some cases, the regular pattern 311 includes columns and rows of clusters of light emitting elements that are arranged generally perpendicularly relative to one another. In some cases, the regular pattern of light can include an angled regular (e.g., slanted or rhombus-like) pattern 312 comprising clusters of lights. That is, in some embodiments, the regular pattern includes columns and rows of clusters of light emitting elements in which rows can be angled, or non-perpendicular, with respect to the direction of columns.

FIG. 3C depicts an example in which the array projects a regular pattern of a sub pattern of lights (e.g., a grid of smaller clusters of light) that can have differently shaped clusters in one direction of the grid 321 (e.g., along rows of the x-axis) and commonly shaped clusters in one direction of the grid 322 (e.g., along columns or the y-axis). In some cases, as depicted, the grid can have a sequence of differently shaped clusters 323 from column to column (e.g., marked A, B, and C in FIG. 3C). In some embodiments, the sequence of differently shaped clusters along a row can be repeated (e.g., A, B, C, A, B, C, etc.).

Figure 4:
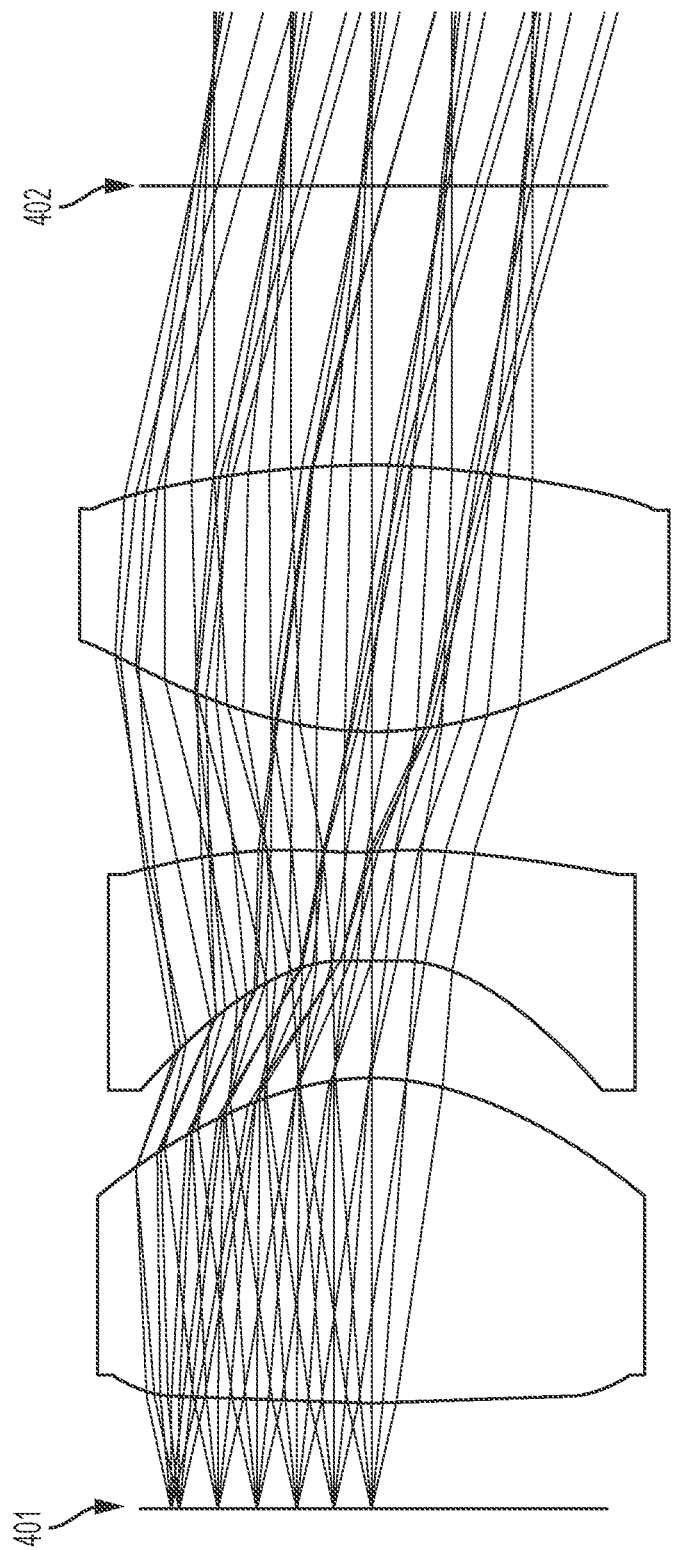
FIG. 4 illustrates an exemplary projection lens system that includes one or more lens elements, which can be used according to embodiments of the present invention.

FIG. 4 depicts an example projection lens system between an object plane 401 and an image plane 402. The projection lens system, or projection lens, can include one or more optical components that project light from the light emitting elements. Any of various configurations are possible. For example, the projection lens can include one or more lens elements. The projections lens, or the one or more lens elements forming the projection lens, can be formed by any of various suitable manufacturing techniques. For example, the projection lens can be fabricated by injection molding or wafer-level manufacturing techniques.

The specific optical properties of the projection lens can be adapted for specific applications. In some embodiments, the projection lens can have an effective focal length that is less than or equal to about 5 millimeters (mm) (e.g., about 1.5 mm to about 5 mm). In some embodiments, the projection lens can have an object field height that is less than or equal to about 1 mm (e.g., about 0.2 mm to about 1.0 mm).

Additionally, specific configurations of lens types can also be adapted for use. In some embodiments, a lens element can be telecentric on an object side of the projection lens, with no system aperture. However, in some embodiments, arrangements can include non-telecentric designs (e.g., chief ray angle (CRA)< >0 deg) and use one or more system apertures.

Figure 5:
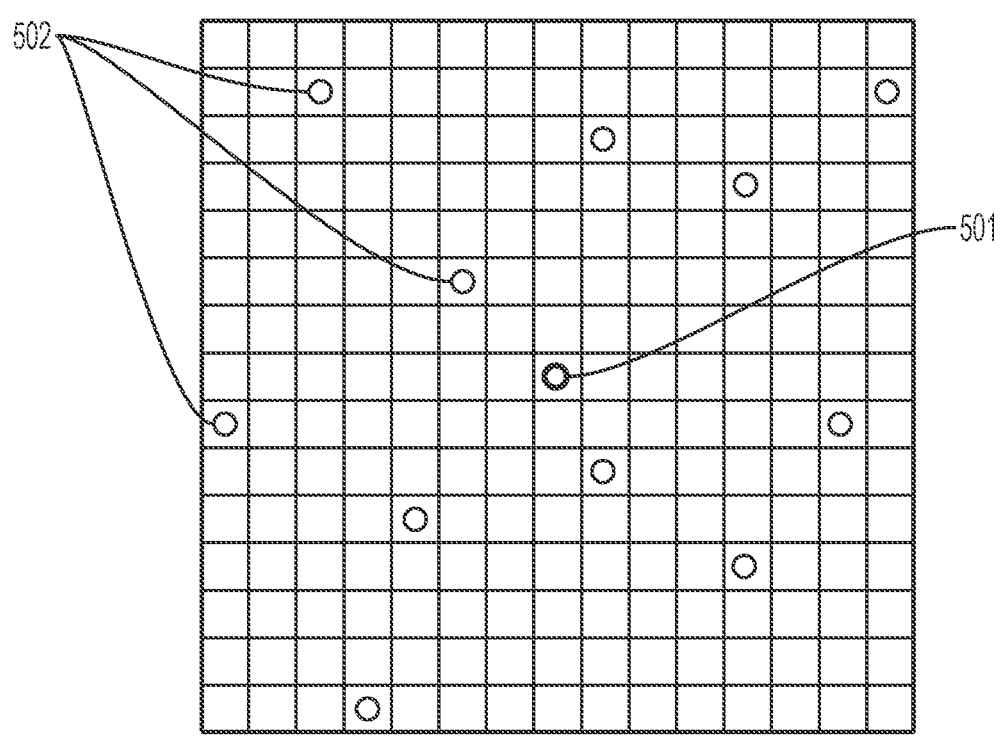
FIG. 5 illustrates an exemplary optical element, configured to illuminate only desired diffraction orders, which can be used according to embodiments of the present invention.

FIG. 5 depicts an example optical element that can be used with the systems and methods herein. In some embodiments, as discussed above, the optical element can be used to create irregular or randomized patterns of light from the light produced by the regular array, which can be a regular light pattern. In some embodiments, the optical element can be a diffractive optical element.

In some embodiments, a diffractive optical element can include a diffraction grating, typically a 2-dimensional grating, which splits an incoming beam 501. For example, the incoming beam entering the diffractive optical element can be emitted from a single light emitting element, such as a VCSEL, after having been collimated by the projection optics, such as the projection lens.

The diffractive optical element can be formed in any of various suitable constructions. For example, in some embodiments, the diffractive optical element can be formed as a binary transmission mask. In some embodiments, the diffractive optical element can be formed as a phase element, which can include a surface relief profile with 2, 3 . . . 16 discrete levels or a continuous profile or any other optical microstructure that imposes an appropriate phase shift on the incoming wave.

If the unit cell of the diffractive grating contains n×n pixels with different phase levels (N: uneven number), a grid of n×n diffraction orders can be created.

In the case shown in FIG. 5, the unit cell of the diffractive grating contains 15×15 orders, with 12 diffraction orders (e.g., illustrative diffraction orders 502) are chosen on randomly chosen positions in this grid.

The diffractive optical element is then configured or optimized to illuminate only the desired diffraction orders. As a result, an irregular pattern can be created.

What is claimed is:

1. A structured light projection system comprising:
   an array of light emitting devices that emits a pattern of light, wherein the array includes a grid of one or more individual clusters of light emitting devices, the individual clusters of light emitting devices including one or more light emitting devices arranged in a non-uniform pattern;
   a first optical element configured to alter the pattern of light emitted by the array of light emitting devices to generate a first emitted pattern of light, the first emitted pattern of light being irregular; and
   a second optical element configured to receive the first pattern of light generated by the first optical element and reproduce the first emitted pattern along a second emitted pattern, the second emitted pattern including multiple instances of the first emitted pattern arranged in a tiled pattern.

2. The structured light projection system of claim 1, wherein the pattern of light emitted by the array is a regular, uniform, grid-like, undisrupted, repeated, consistent, or uniformly distributed pattern.

3. The structured light projection system of claim 1, wherein the first emitted pattern is randomized, non-uniform, non-grid, disrupted, unevenly spaced, partially obstructed, partially blocked, or non-equally distributed.

4. The structured light projection system of claim 1, wherein the first emitted pattern is tiled, distributed, or duplicated along the second emitted pattern.

5. The structured light projection system of claim 1, wherein the second emitted pattern is a uniform, regular, or uniformly distributed pattern.

6. The structured light projection system of claim 1, wherein the structured light projection system further comprises a projection lens system configured to receive the pattern of light emitted from the array and project the pattern of light to the first optical element.

7. The structured light projection system of claim 1, wherein the tiled pattern comprises one or more adjacent instances of the first emitted pattern at least partially overlapping with one another.

8. The structured light projection system of claim 1, wherein the light emitting devices comprise one or more VCSELs.

9. The structured light projection system of claim 1, wherein the individual clusters of light emitting devices including one or more light emitting devices are arranged in a sequence of differing non-uniform patterns, the sequence being reproduced at least once.

10. A method of generating a structured light pattern, the method comprising:
    emitting a pattern of light from an array of light emitting devices,
    wherein the array includes a grid of one or more individual clusters of light emitting devices, the individual clusters of light emitting devices including one or more light emitting devices arranged in a non-uniform pattern;

receiving the pattern of light emitted from the array of light emitting devices and projecting the pattern of light with a projection lens;

altering the pattern of light emitted by the array of light emitting devices using a first optical element to generate a first emitted pattern of light, the first emitted pattern of light being irregular; and receiving the first emitted pattern generated by the first optical element using a second optical element and reproducing the first emitted pattern along a second emitted pattern, the second emitted pattern including one or more instances of the first emitted pattern arranged in a tiled pattern.

11. The method of claim 10, wherein the array includes one or more columns and one or more rows of light emitting devices are arranged generally perpendicular relative to one another.

12. The method of claim 10, wherein the array includes one or more columns and one or more rows of light emitting devices, the one or more rows arranged at a non-perpendicular angle with respect to the one or more columns.

13. The method of claim 10, wherein the array projects a regular pattern of a sub pattern of lights that can have one or more commonly shaped clusters in a first direction of the regular pattern and one or more differently shaped clusters in a second direction of the regular pattern.

14. The method of claim 10, wherein the projection lens comprises a lens element that is telecentric on an object side of the projection lens.

15. The method of claim 10, wherein the first optical element is a diffractive optical element.

16. A method of creating an irregular structured light pattern from a regular array of light emitting elements, the method comprising:

generating a regular pattern of light from a VCSEL array, wherein the VCSEL array includes a grid of one or more individual clusters of VCSELs, the individual clusters of VCSELs including one or more VCSELs arranged in a non-uniform pattern;

altering the regular pattern of light emitted using a first diffractive optical element to generate an irregular representation of light; and reproducing the irregular representation of light along multiple instances arranged relative to one another.

17. The method of claim 16, wherein the irregular representation of light is reproduced using a second diffractive optical element.

18. A method of manufacturing a structured light emitting device, the method comprising:

forming an array of light emitting devices configured to emit a pattern of light, wherein the array includes a grid of one or more individual clusters of light emitting devices, the individual clusters of light emitting devices including one or more light emitting devices arranged in a non-uniform pattern;

disposing a first optical element within an illumination field of the array of lighting devices, the first optical element being configured to alter the pattern of light emitted by the array of light emitting devices to generate a first emitted pattern of light, the first emitted pattern of light being irregular; and disposing a second optical element within an illumination path of the first emitted pattern of light, the second optical element being configured to receive the first pattern of light generated by the first optical element and reproduce the first emitted pattern along a second emitted pattern, the second emitted pattern including multiple instances of the first emitted pattern arranged in a tiled pattern.

\* \* \* \* \*